(12) United States Patent
Marks

(10) Patent No.: US 11,838,688 B2
(45) Date of Patent: Dec. 5, 2023

(54) SYSTEM FOR CAPTURING MEDIA OF A PRODUCT

(71) Applicant: MMAPT IP Pty Ltd., Fitzroy (AU)

(72) Inventor: Thomas Westley Marks, Eltham (AU)

(73) Assignee: MMAPT IP Pty Ltd., Fitzroy (AU)

( * ) Notice: Subject to any disclaimer, the term of this patent is extended or adjusted under 35 U.S.C. 154(b) by 0 days.

(21) Appl. No.: 17/059,094

(22) PCT Filed: May 28, 2019

(86) PCT No.: PCT/AU2019/050524
§ 371 (c)(1),
(2) Date: Nov. 25, 2020

(87) PCT Pub. No.: WO2019/227143
PCT Pub. Date: Dec. 5, 2019

(65) Prior Publication Data
US 2021/0227181 A1    Jul. 22, 2021

(30) Foreign Application Priority Data
May 28, 2018 (AU) ................................ 2018901876

(51) Int. Cl.
*H04N 7/18* (2006.01)
*B25J 9/00* (2006.01)
(Continued)

(52) U.S. Cl.
CPC ............ *H04N 7/183* (2013.01); *B25J 9/0096* (2013.01); *F16M 11/121* (2013.01); *H04N 5/76* (2013.01);
(Continued)

(58) Field of Classification Search
CPC ........ H04N 7/183; H04N 5/76; H04N 5/2256; H04N 5/2354; F16M 11/121; F16M 2200/066; B25J 9/0096
See application file for complete search history.

(56) References Cited

U.S. PATENT DOCUMENTS 9,412,203 B1    8/2016  Garcia, III et al.
10,122,997 B1 *  11/2018  Sheffield .............. H04N 13/282
(Continued)

FOREIGN PATENT DOCUMENTS

EP    3421930    1/2019
JP    3609669    5/2001
(Continued)

*Primary Examiner* — Girumsew Wendmagegn
(74) *Attorney, Agent, or Firm* — Potomac Law Group, PLLC; John J. Penny, Jr.

(57) ABSTRACT

A system for capturing images of a product from a series of fixed positions around the product, including a control system including one or more processors in communication with data storage; an actuator; a media capturing device coupled to the actuator; and a mount including an upper surface for displaying the product thereon wherein said data storage includes a plurality of instructions stored thereon which, when executed by the one or more processors, cause the system to perform the steps of moving the actuator so as to locate the media capturing device in a first one of said fixed positions with respect to the product displayed on the mount; actuating the media capturing device to capture a first image of the product; saving said image of the product in said data storage; and repeating the steps for each successive fixed position in the series.

11 Claims, 13 Drawing Sheets

(51) Int. Cl.
*F16M 11/12* (2006.01)
*H04N 5/76* (2006.01)
*H04N 23/56* (2023.01)
*H04N 23/74* (2023.01)

(52) U.S. Cl.
CPC ............ *H04N 23/56* (2023.01); *H04N 23/74* (2023.01); *F16M 2200/066* (2013.01)

(56) References Cited

U.S. PATENT DOCUMENTS

| | | | |
|---|---|---|---|
| 2015/0029359 A1* | 1/2015 | Nenonen | H04N 1/6077 348/224.1 |
| 2015/0138320 A1* | 5/2015 | El Daher | G01B 11/2522 348/46 |
| 2016/0156829 A1* | 6/2016 | Takamori | F16M 11/10 348/207.1 |
| 2019/0073760 A1* | 3/2019 | Wang | G06T 7/0004 |
| 2019/0289196 A1* | 9/2019 | Kato | H04N 5/23216 |

FOREIGN PATENT DOCUMENTS

| | | | |
|---|---|---|---|
| JP | 2002344775 | | 11/2002 |
| JP | 2013225733 A | * | 10/2013 |
| WO | WO 01/63354 | | 8/2001 |
| WO | WO 2017/146202 | | 8/2017 |

\* cited by examiner

SYSTEM FOR CAPTURING MEDIA OF A PRODUCT

CROSS REFERENCE TO RELATED APPLICATIONS AND CLAIM TO PRIORITY

This application is a § 371 National Stage Application of PCT/AU2019/050524, filed May 28, 2019, which claims priority to Australian Patent Application No. 2018901876, filed May 28, 2018, which applications are herein incorporated by reference in their entireties and to which priority is claimed.

FIELD OF THE INVENTION

The present invention relates to a system and method for capturing images of a product from a series of fixed positions around the product.

BACKGROUND OF THE INVENTION

In recent years, online shopping has quickly gained popularity due to the convenience of not having to leave ones house and the ability to make a purchase at any time of the day, or night. As a result, e-commerce has quickly become some customer's preferred method of purchase as compared to traditional brick and mortar retail stores.

In addition to the ease of purchase afforded by e-commerce, customers are able to order goods or services from stores that are not within the customer's vicinity. This provides a customer more choices of online stores and therefore the ability to choose an e-store with a lower price point. To stay competitive, retailers have to reduce prices and streamline their processes to increase or maintain profitability.

As part of the online shopping experience, a customer is unable to see, touch and try on a product. As such, it is important for a retailer to provide content which has enough information for customers to be able to make an informed decision. Further, the content shown to the customer should be appealing enough to the customer to convince them to purchase the product.

As such, some retailers invest time and money into producing media for their products, which is needed for each product to be catalogued for display on the respective e-stores. Typically, this includes a team of highly skilled photographers, stylists, studios, lighting and other production equipment which is typically slow, labour intensive and expensive. For example, current systems include disconnected lighting systems, a media capture systems and a mounting platform. Each of these systems require professionals to separately operate, to set up and calibrate these separate component parts prior to being able to capturing images for products. For example, a single product may take around 70 minutes to create three photographs and a single 360° video. Retailers with a big portfolio of products and who are constantly updating their e-stores with new products will spend a lot of time and money producing media for their products. Retailers often find themselves in need of a more efficient method of obtaining media content of products.

It is generally desirable to overcome or ameliorate one or more of the above described difficulties, or to at least provide a useful alternative.

SUMMARY OF THE INVENTION

In accordance with the present invention, there is provided a system capturing images of a product from a series of fixed positions around the product, including:

(a) a control system including one or more processors in communication with data storage;
(b) an actuator;
(c) a media capturing device coupled to the actuator; and
(d) a mount including an upper surface for displaying the product thereon;
wherein said data storage includes a plurality of instructions stored thereon which, when executed by the one or more processors, cause the system to perform the steps of:
(a) moving the actuator so as to locate the media capturing device in a first one of said fixed positions with respect to the product displayed on the mount;
(b) actuating the media capturing device to capture a first image of the product;
(c) saving said image of the product in said data storage; and
(d) repeating steps (a) to (c) for each successive fixed position in the series.

In accordance with the present invention, there is also provided a method for capturing an image of a product, performed by one or more processors in communication with data storage includes a plurality of instructions stored thereon which, when executed by the one or more processors, cause the system to perform the steps of:
(a) moving an actuator so as to locate a media capturing device in a first one of said fixed positions with respect to the product displayed on a mount;
(b) actuating the media capturing device to capture a first image of the product;
(c) saving said image of the product in said data storage; and
(d) repeating steps (a) to (c) for each successive fixed position in the series.

In accordance with the present invention, there is also provided a system for capturing one or more images of a product, including:
(a) a control system including one or more processors in communication with data storage;
(b) an actuator;
(c) a media capturing device coupled to the actuator; and
(d) a mount including an upper surface for displaying the product thereon;
wherein said data storage includes a plurality of instructions stored thereon which, when executed by the one or more processors, cause the system to perform the steps of:
(a) moving the actuator so as to locate the media capturing device in a predetermined position with respect to the product displayed on the mount;
(b) actuating the media capturing device to capture an image of the product; and
(c) saving said image of the product in said data storage.

BRIEF DESCRIPTION OF THE DRAWINGS

Preferred embodiments of the invention are hereafter described, by way of non-limiting example only, with reference to the accompanying drawings, in which:

FIG. 4b is a diagram showing a section view through the line A-A of the embodiment of the system shown in FIG. 4a;

DETAILED DESCRIPTION OF EMBODIMENTS OF THE INVENTION

Figure 1:
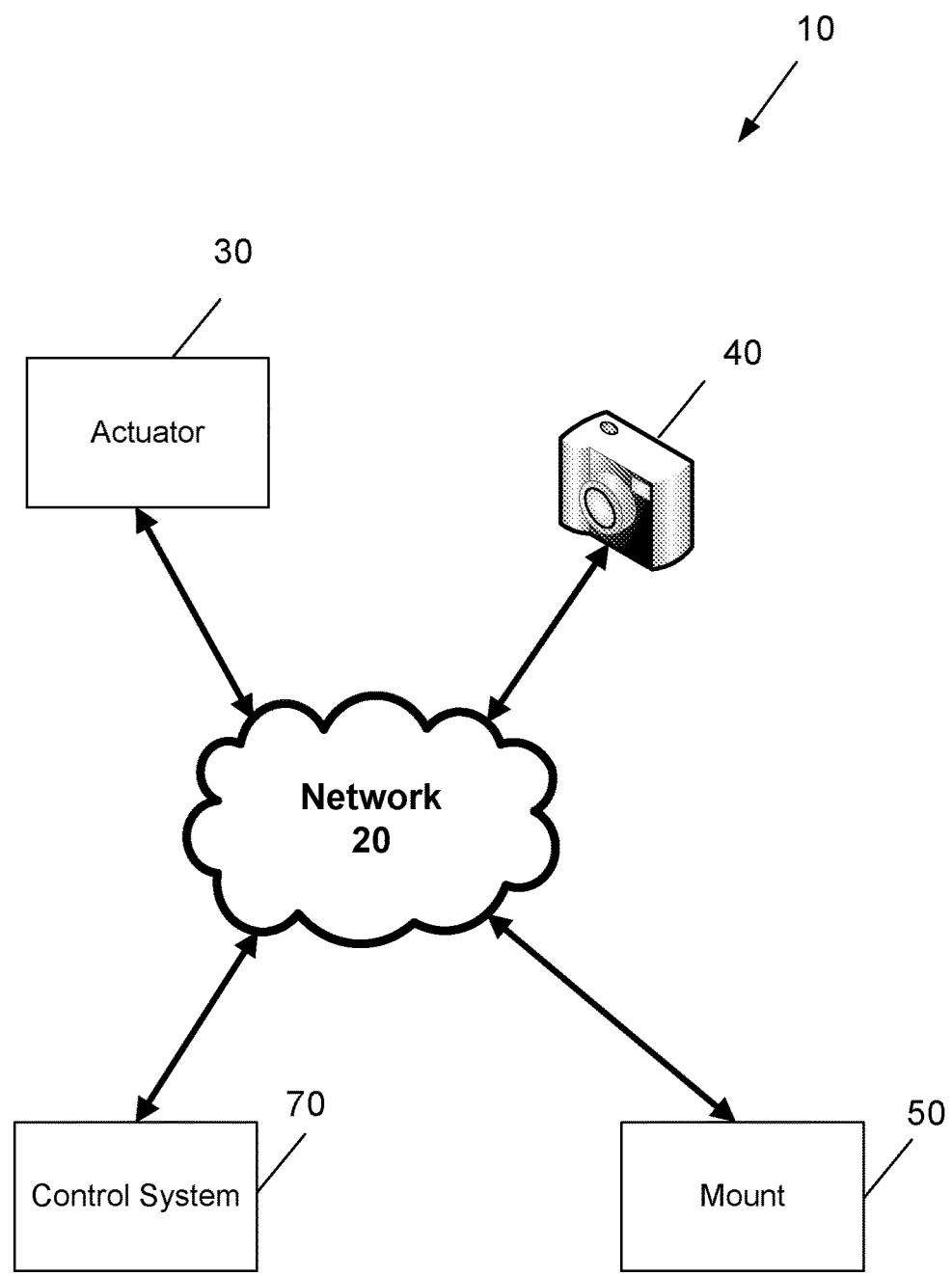
FIG. 1 is a schematic diagram of a system for capturing images of a product from a series of fixed positions around the product.

The system 10 shown in FIG. 1 allows images of a product to be captured from a series of fixed positions around the product. The system 10 includes one or more of the following:
   (a) a control system 70 including one or more processors in communication with data storage 3024;
   (b) an actuator 30;
   (c) a media capturing device 40 coupled to the actuator 30; and
   (d) a mount 50 including an upper surface for displaying the product thereon.

Figure 5A:
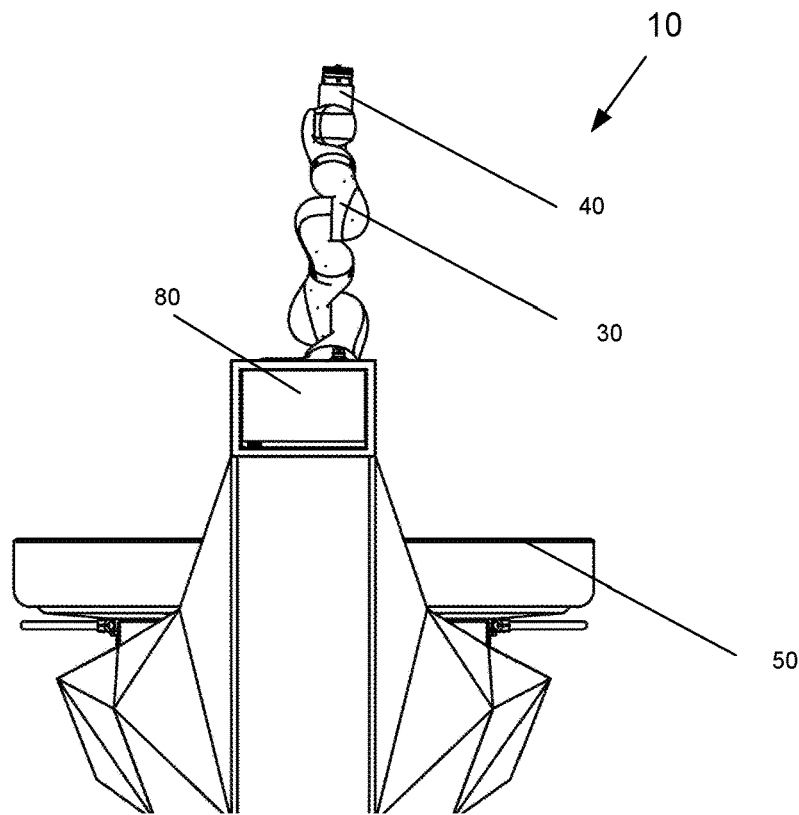
FIG. 5a is a diagram showing a back view of an embodiment of the system shown in FIG. 1.

In some embodiments, the mount 50 includes a turntable 55 and a lighting system 60. In other embodiments, the control system 70 includes a server 75 and a mobile computing device 80 for receiving user instruction and communicating the user instruction to the one or more processors 3028 of the control system 70. For example, mobile computing device 80 may be located posterior to the actuator 30 as particularly shown in FIG. 5a.

The components of system 10 are in communication via the network 20. The communication network 20 may include the Internet, telecommunications networks and/or local area networks. In some embodiments, network 20 is a wireless communication system such as Wi-Fi, Bluetooth or NFC. Network 20 may also include wired connections such as USB or other forms of data transfer systems.

The system 10 makes capturing images and/or video of a product to be captured simpler, faster and more convenient. Advantageously, the system 10 allows media of a product that has been placed on the mount 50 to be captured automatically i.e. without user 90 intervention, upon receipt of user instruction. The captured media may include images of the product taken from various angles and a 360-degree video, for example. In some embodiments, post processing of the captured media may be performed after the media has been captured. Advantageously, system 10 allows media of a product to be captured efficiently i.e. in much less time and manpower compared to previous known systems.

Preferably, system 10 for capturing images of a product from a series of fixed positions around the product includes one or more of the following:
   (a) control system 70 including one or more processors 3028 in communication with data storage 3024;
   (b) an actuator 30;
   (c) media capturing device 40 coupled to a distal end of the actuator 30; and
   (d) a mount 50 including an upper surface for displaying the product thereon.

Advantageously, said data storage 3024 includes a plurality of instructions stored thereon which, when executed by the one or more processors, cause the system to perform the steps of:
   (a) moving the actuator 30 so as to locate the media capturing device 40 in a first one of said fixed positions with respect to the product displayed on the mount 50;
   (b) actuating the media capturing device 40 to capture a first image of the product;
   (c) saving said image of the product in said data storage 3024; and
   (d) repeating steps (a) to (c) for each successive fixed position in the series.

In some embodiments, more than one image may be captured to make a video such as a 360° video.

Figure 6A:
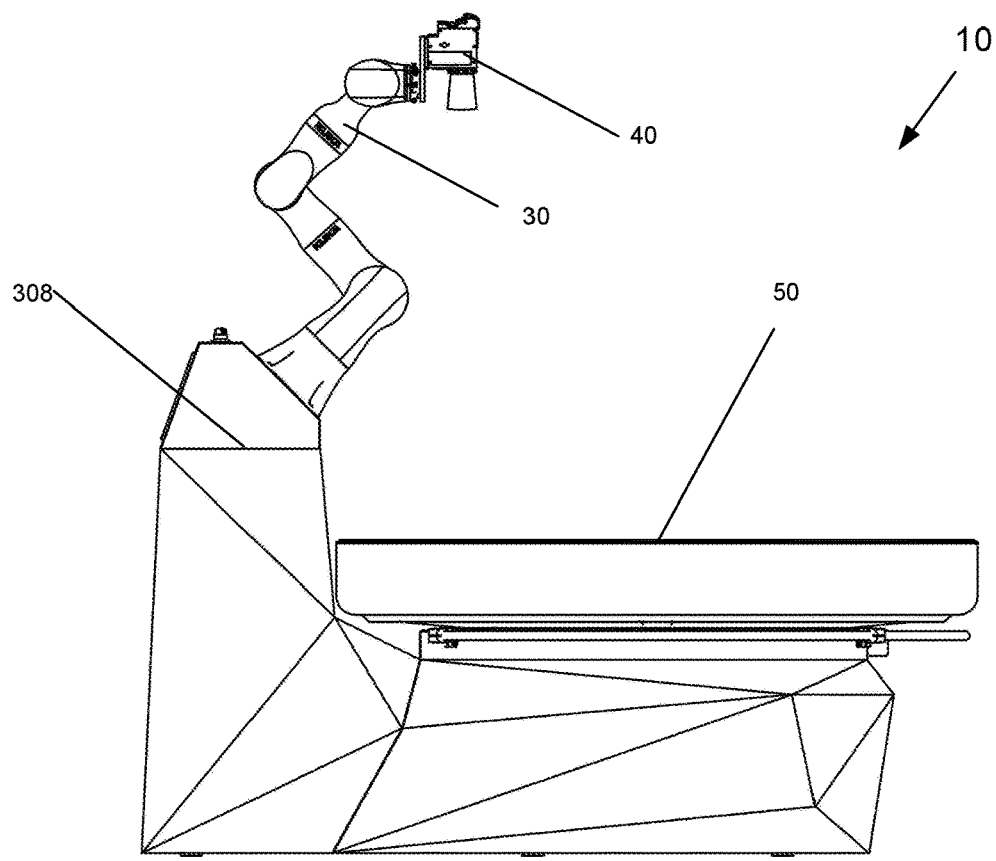
FIG. 6a is a diagram showing a side view of an embodiment of the system shown in FIG. 1 in a first position.
Figure 6B:
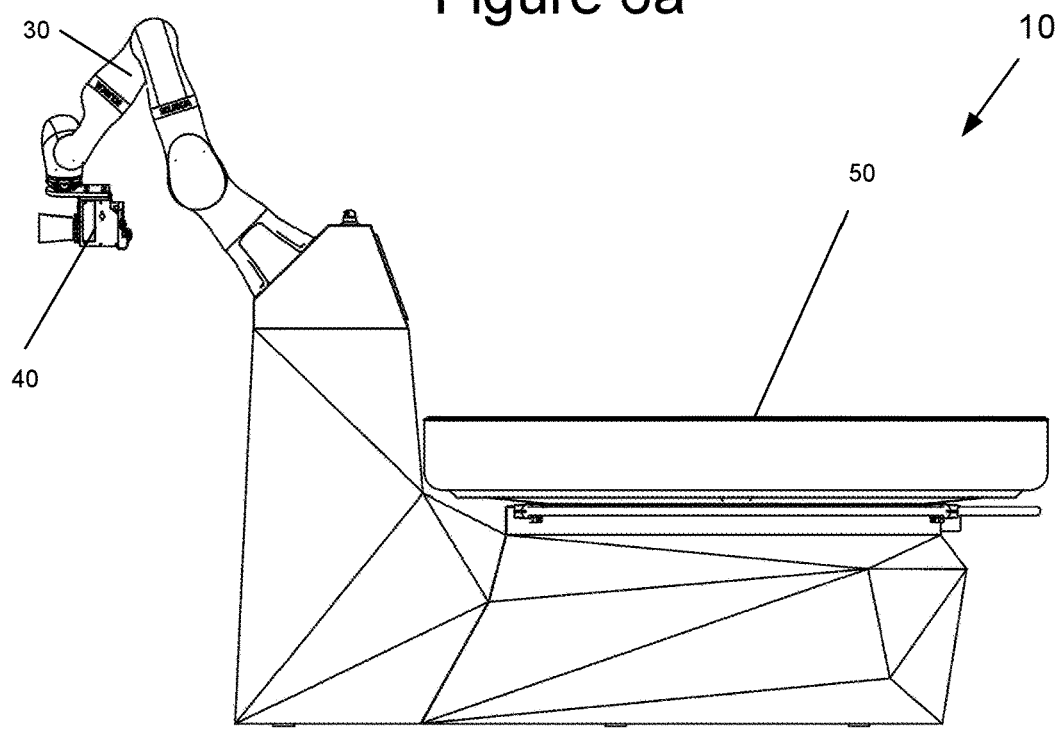
FIG. 6b is a diagram showing a side view of an embodiment of the system shown in FIG. 1 in a second position.

As particularly shown in FIG. 6a, an embodiment of the invention is shown where the media capturing device 40 is in a first position for capturing images of a product from a series of fixed positions around the product. FIG. 6b shows the media capturing device 40 in a second position for capturing an image of a product and/or person that is not placed on the mount 50, but rather may be placed on the floor. This configuration is particularly useful for larger objects which may be placed further away from the media capturing device 40 for a bigger field of view. In this embodiment, the robot base 308 is detachable to enable the actuator 30 to switch from position 1 as particularly shown in FIG. 6a to position 2 as particularly shown in FIG. 6b, or vice versa. In this embodiment, shaft and bearings 302 as particularly shown in FIG. 3c are included to allow the system to be switch between position 1 and position 2 configurations.

Figure 3A:
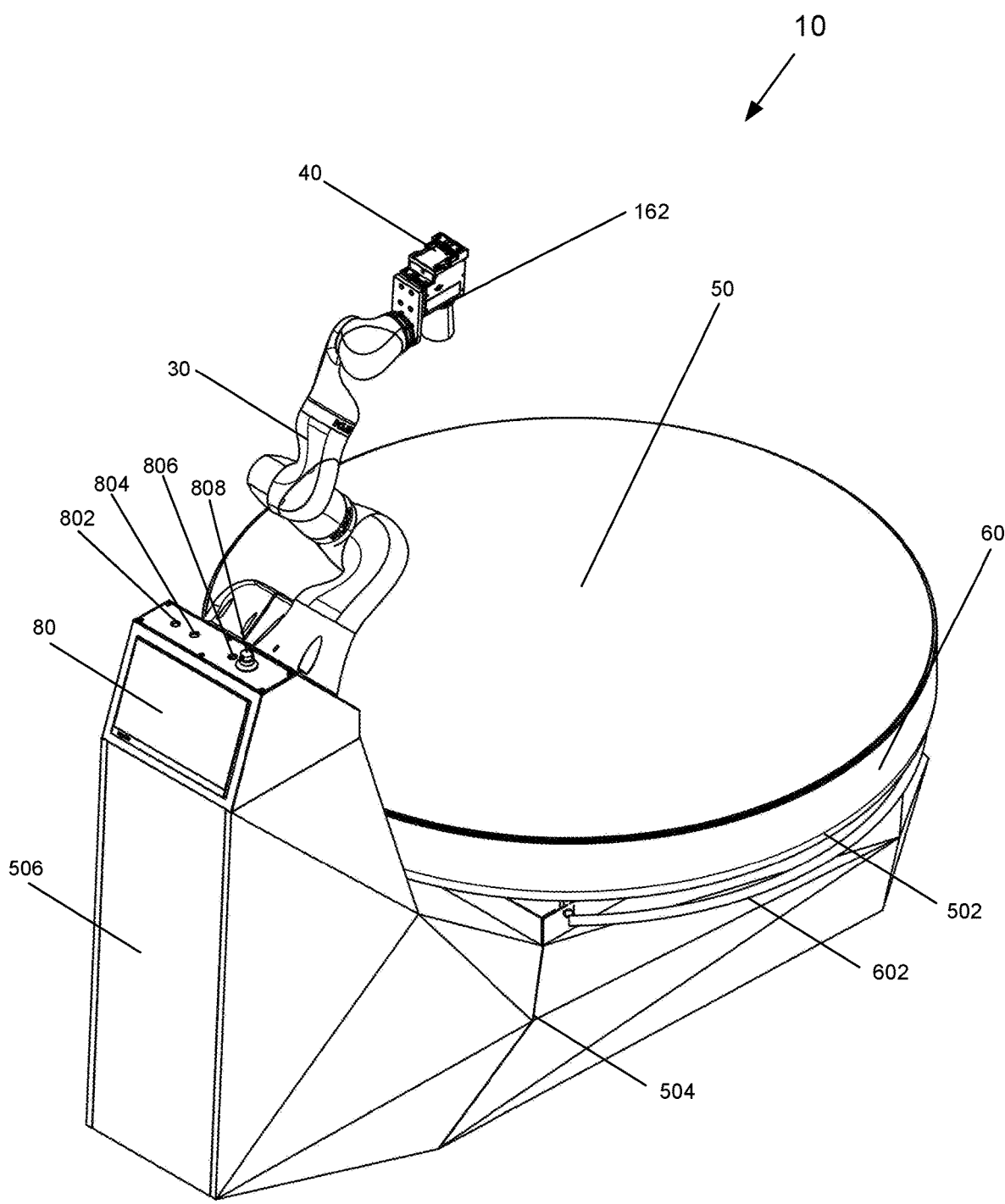
FIGS. 3a, 3b and 3c are diagrams showing perspective views of an embodiment of the system shown in FIG. 1.
Figure 3B:
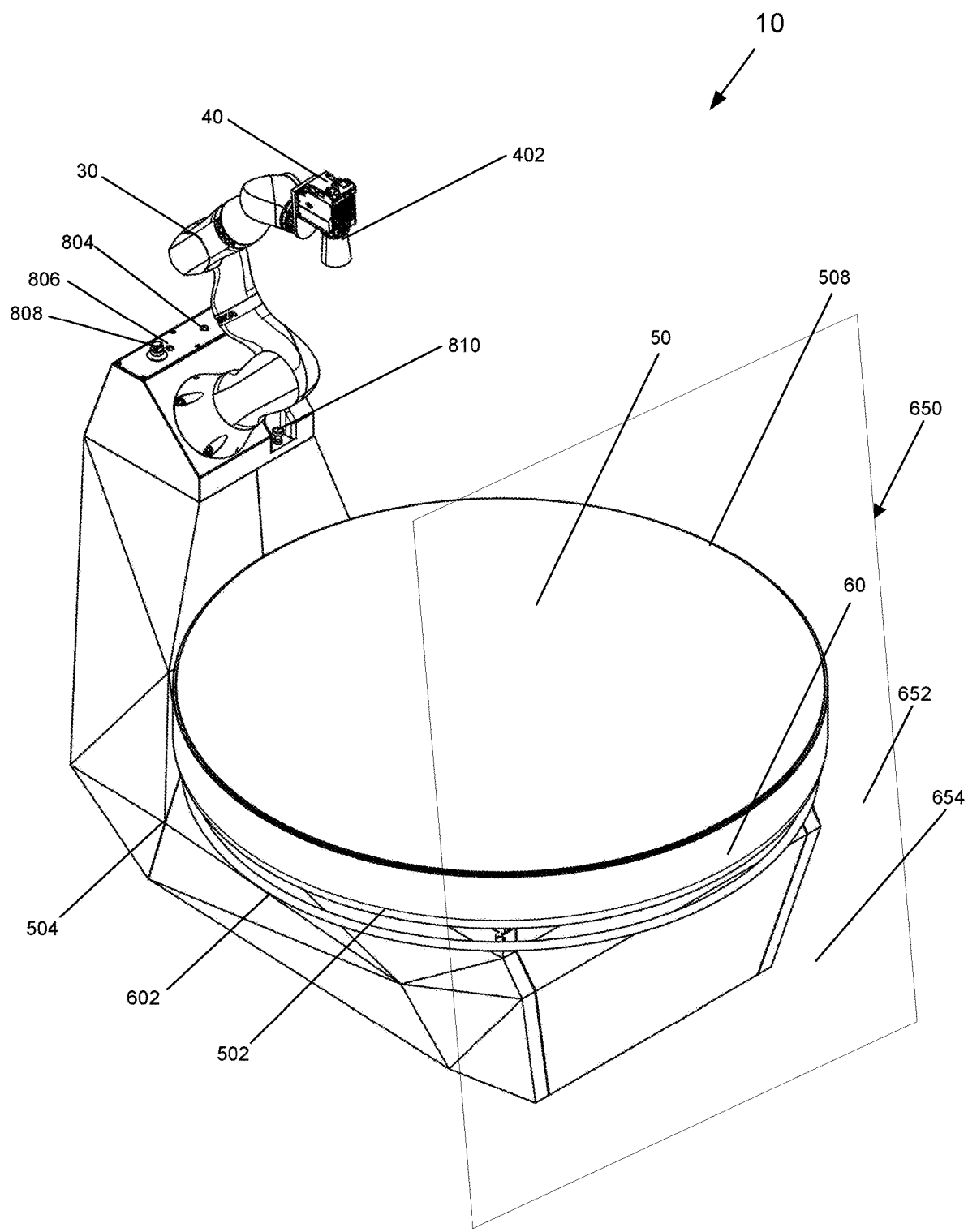
Figure 3C:
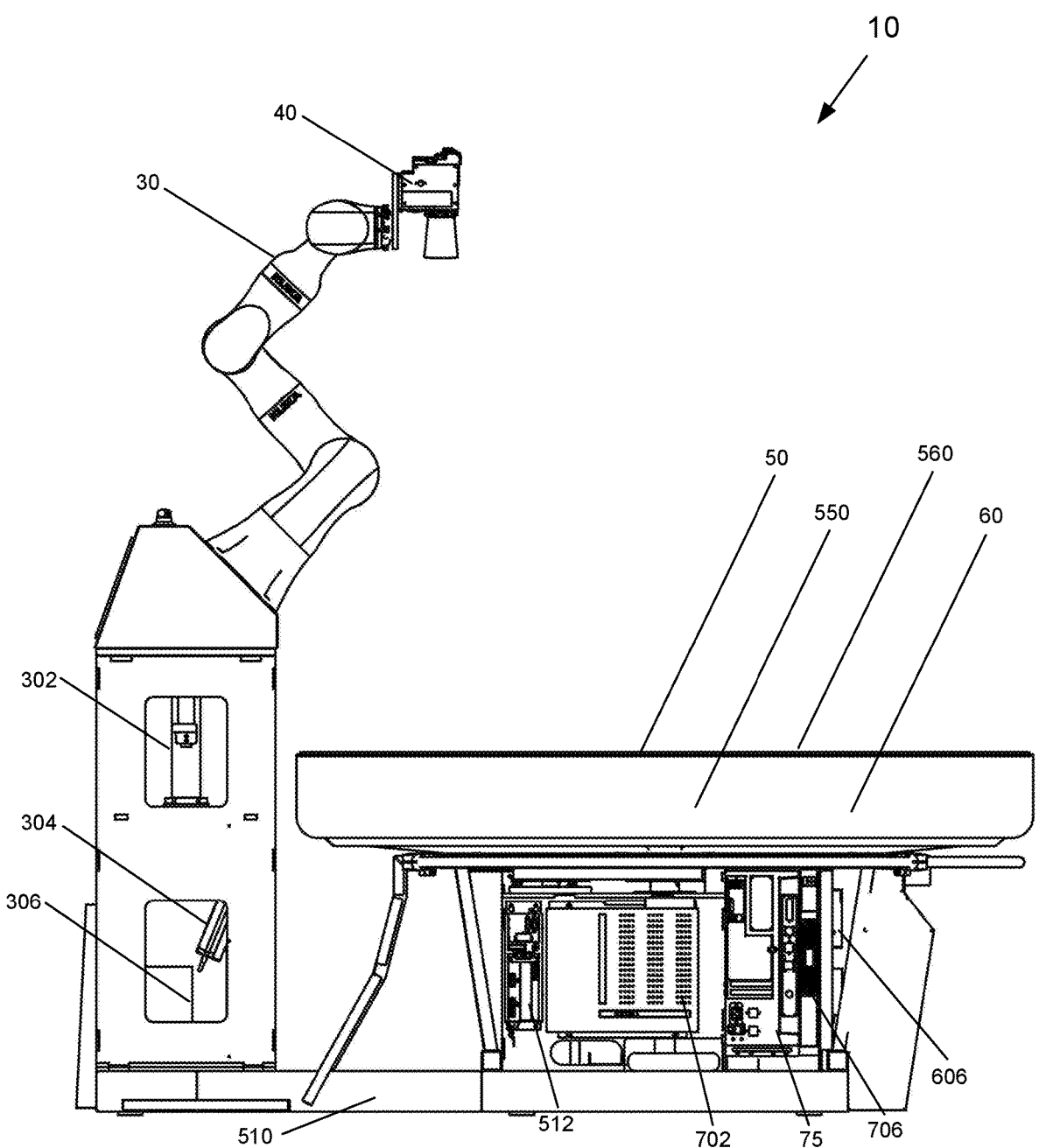

As particularly shown in FIG. 3c, robot teach pad 304 is included at the base of the robot for programming the robot including obtaining coordinates for fixed positions around the mount. In some embodiments, data storage HDD 306 is included for storing data to be accessible by the robot.

Figure 2A:
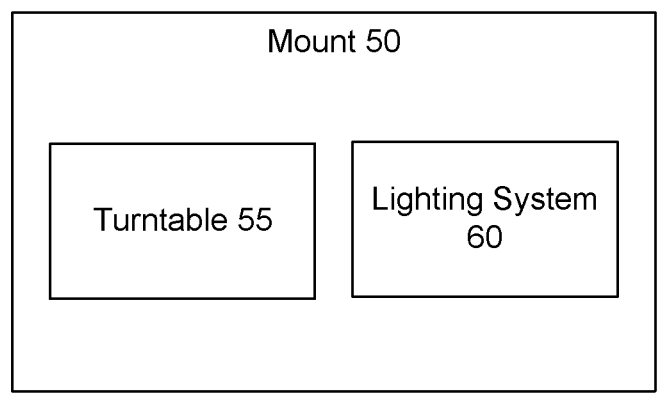
FIG. 2*a* is a schematic diagram of a mount of the system shown in FIG. 1.

Preferably as particularly shown in FIG. 2a, the mount 50 includes:
   (a) a turntable 55, wherein on receipt of a velocity instruction from the control system 70, the turntable 55 rotates about an axis for rotating the displayed product from a fixed position to another fixed position to capture an image of the product from the another fixed position; and
   (b) a lighting system 60 for illuminating the displayed product.

For example, the lighting system 60 includes one or more LED lights. Advantageously, the lighting system 60 illuminates the displayed product while the media capturing device 40 is capturing one or more images of the product by receiving lighting instruction from the control system 70.

Preferably, the actuator 30 is couplable to various types of media capturing devices.

Advantageously, the turntable 55 includes a motor for causing the turntable 55 to rotate about the axis. For example, a servo drive 512 as particularly shown in FIG. 3c is mounted below the turntable 55 for controlling the rotation of the turntable 55. As particularly shown in section view of FIG. 4b, the turntable 55 includes inner turntable 514, turntable support shaft 516, drive belt 518 and servo motor 520 for allowing the turntable 55 to rotate about an axis.

The turntable 55 is in communication with the control system for receiving turntable instruction. Preferably, upon receipt of instructions from the control system 70, the turntable 55 rotates from a fixed position to another fixed position to allow the media capturing device 40 to capture an image of the product from the another fixed position.

For example, turntable 55, upon receipt of instruction from the control system 70, rotates the product about an axis at a fixed velocity to allow the media capturing device 40 to capture one or more images of the product from one or more fixed positions as it rotates. In another embodiment, turntable instruction includes one or more of the following:

(a) angular displacement of the turntable 55 from a first position to a second position; and
(b) angular velocity of the turntable 55 with respect to the axis of the turntable 55.

Preferably, the lighting system 60 is in communication with the control system 70 for receiving lighting instruction. As particularly shown in FIG. 3a, the lighting system 60 includes a lighting support ring 602 which is coupled to the mount 50 where external lights can be mounted here and power supplied directly from the unit. In another embodiment, as particularly shown in FIG. 3b, the lighting system 60 further or alternatively includes a lighting wall system 650. Preferably, the lighting wall system 650 includes a vertical mount 652 including a plurality of lights 654 coupled therein. For example the plurality of lights 654 are LED lights. Advantageously, the lighting wall system 650 is in communication with the lights mounted on the lighting support ring 602 via network 20.

In some embodiments, the lighting wall system 650 and lights mounted on the lighting support ring 602 are in communication with the control system 70, for sending and receiving lighting instructions. For example, lighting instructions include synchronizing the lighting settings for the lights during image capture.

Figure 4A:
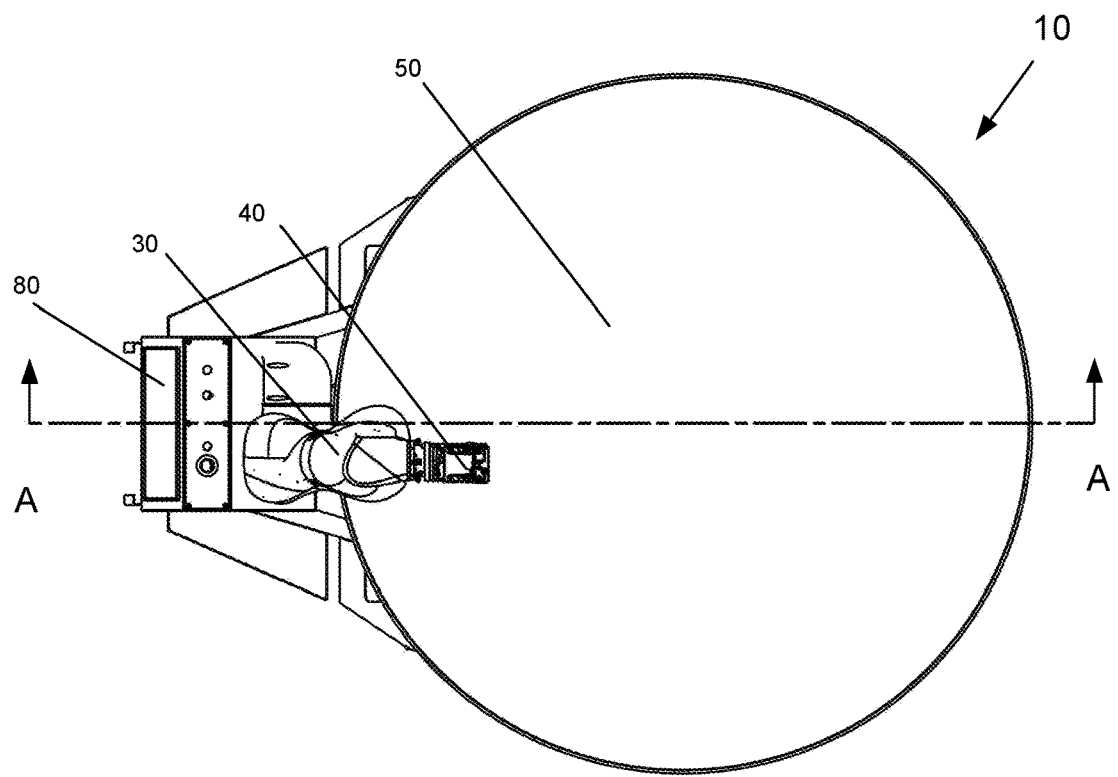
FIG. 4a is a diagram showing a top view of an embodiment of the system shown in FIG. 1.
Figure 4B:
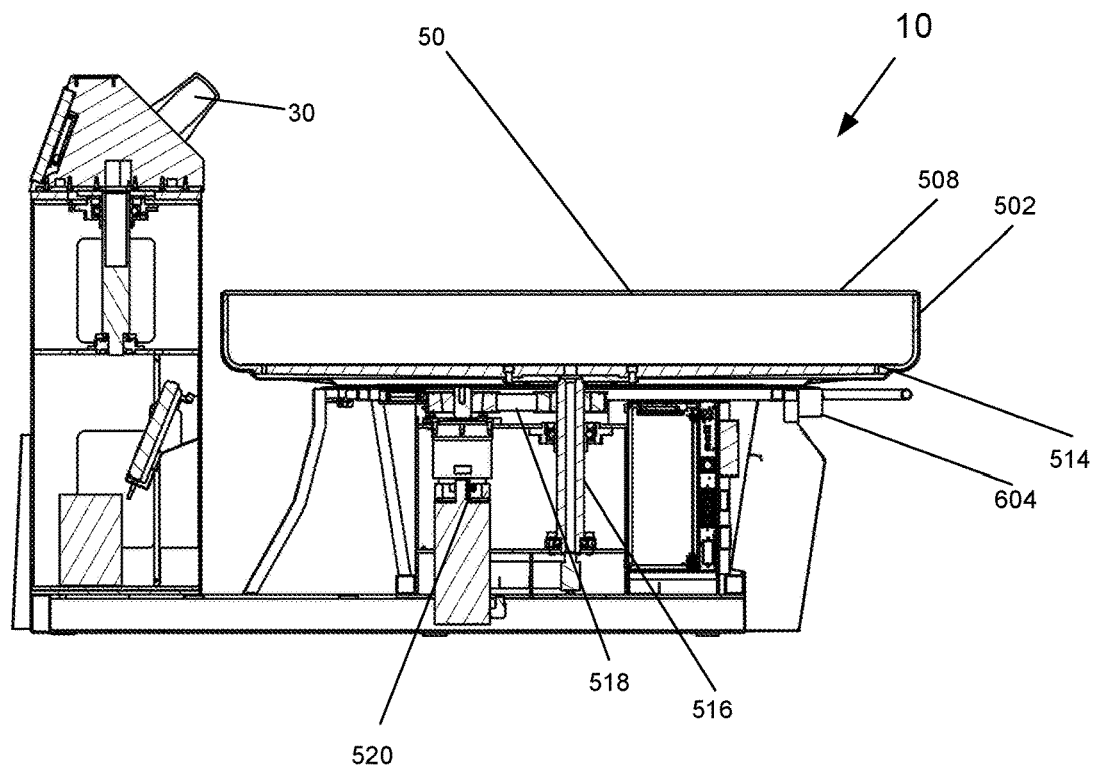

As particularly shown in FIG. 4b (section A-A as shown in FIG. 4a), power point 604 is located below the mount 50 for providing power to the lighting system 60. Further, as particularly shown in FIG. 3c, power supply 606 is located in the mount 50 for providing power to LED lighting.

For example, lighting instruction includes one or more of the following:

(a) lighting settings; and
(b) lighting timer settings for when to switch on or off;

In some embodiments, the system 10 further includes a weighing device 550 and/or scaling device 560. The weighing device 550 may be incorporated into the mount 50 so that when a product is placed on the mount 50, the weighing device 550 obtains the weight of the product. Advantageously, the weight of the product is stored in data storage 3024, for example. In some embodiments, the weight of the product is stored with the image captured by the media capturing device 40.

The scaling device 560 provides one or more dimensions of a product placed on the mount 50. This may be provided by post-processing one or more images captured by the media capturing device 40. In some embodiments, a ruler or line gauge is placed, for example on the mount 50, within the field of view of the image captured by the media capturing device 40 so as to allow one or more dimensions of the product to be calculated. For example, the one or more dimensions of the product include the length, height and/or depth of the outer bounds of the product.

In some embodiments, the lens 402 of media capturing device 40 is in communication with the control system 70 for receiving focus, aperture and zoom instructions. For example, the lens has remote focus control which is programmed in sync with robot motion.

Figure 2B:
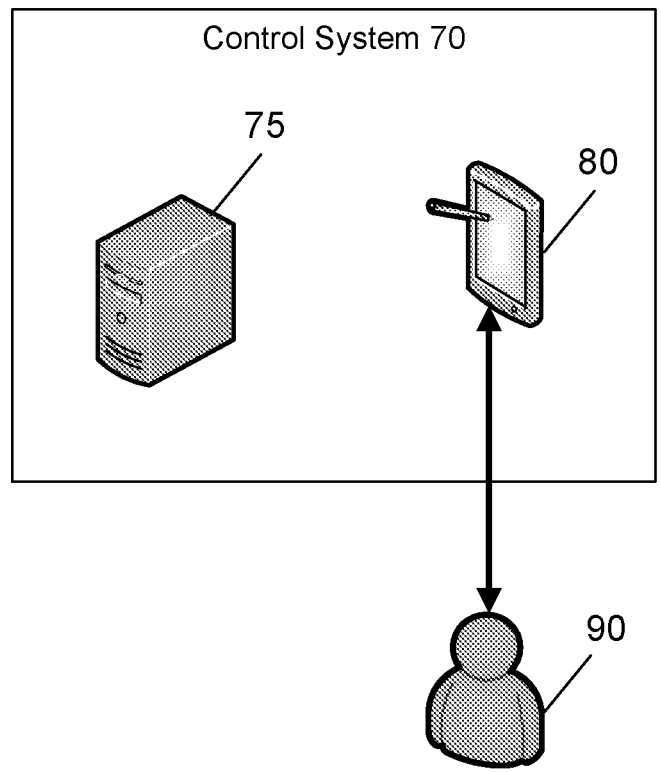
FIG. 2*b* is a schematic diagram of a control system of the system shown in FIG. 1.

Preferably, control system 70 includes server 75 and mobile computing device 80 as particularly shown in FIG. 2b.

As particularly shown in FIG. 3b, the mount 50 preferably includes a cover 502. For example, the cover 502 is made of carbon fibre for protecting the internals of the mount 50. The mount 50 preferably further includes lower covers 504, access panels 506, a glass top 508 and a steel frame 510 as particularly shown in FIGS. 3a and 3b.

Preferably, the actuator 30 is a robotic arm as particularly shown in FIG. 3 and the robotic arm, upon receipt of an instruction from the control system 70, moves so as to locate the media capturing device 40 in one or more fixed position with respect to the product displayed on the mount 50. For example, the robot is a 7-axis robot arm. Of course, other arms could also be used such robotic arms with 5 or 6 degrees of freedom. In some embodiments, the media capturing device 40 is coupled to a distal end of the robotic arm so that the step of moving the actuator 30 so as to locate the media capturing device 40 in a fixed position includes moving the distal end of the robotic arm to the fixed position.

Advantageously, the robotic arm 30 is in communication with the control system 70, in particular the server 75, for receiving actuator instruction. For example, actuator instruction includes one or more of the following:

(a) coordinates of a second location for the distal end of the actuator; and
(b) data associated with motion planning between a first location and the second location.

The control system 70 preferably performs motion planning for setting a path for the actuator 30 to move from a first position to a second position.

Advantageously, the control system 70 further includes a mobile computing device 80 for receiving user instruction and communicating the user instruction to the one or more processors 3028 of the control system 70. The mobile computing device 80 is preferably running an application 2018. In some embodiments, data associated with the user instruction is used as an input to one or more of the following:

(a) actuator instruction;
(b) lighting instruction;
(c) media capture instruction; and
(d) turntable instruction.

For example, the mobile computing device 80 is a tablet computer such as an iPad or smartphone such as an iPhone. The mobile computing device 80 for receiving user input via application 2018 or displaying data such as images taken by the media capturing device 40. In an alternate embodiment, the mobile computing device 80 is an interactive kiosk including a display. In some embodiments, the display is a touch screen for receiving user input. Advantageously, the mobile computing device 80 is in communication with network 20.

Figure 5B:
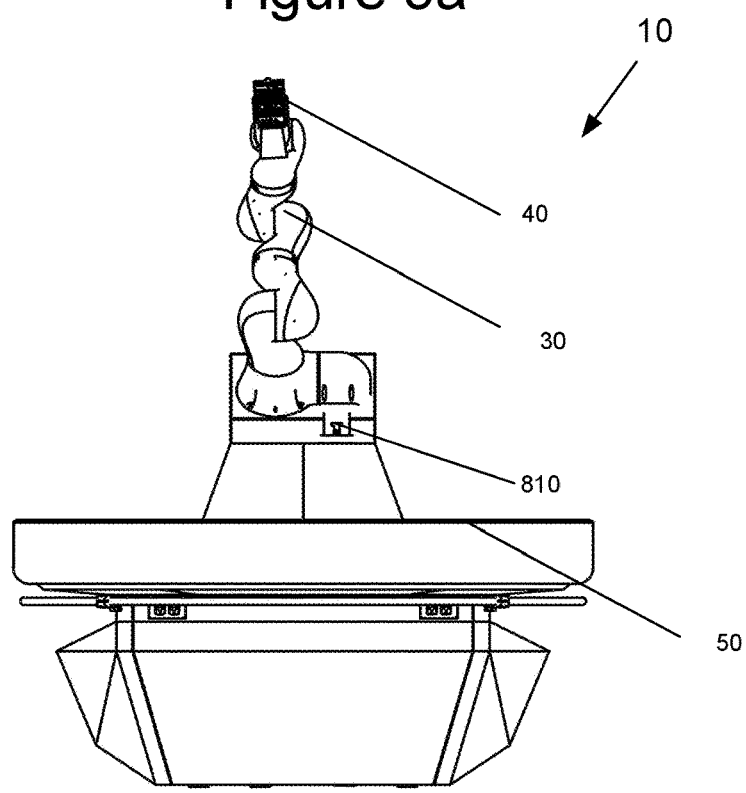
FIG. 5b is a diagram showing a front view of an embodiment of the system shown in FIG. 1.

As particularly shown in FIGS. 3a, 3b and 5b, system 10 preferably includes USB access port 802, a power on/off switch 804, warning buzzer 806, emergency stop button 808 and index plunger 810 to lock robot base in position.

In some embodiments, one or more of the actuator instruction, lighting instruction, media capture instruction and turntable instruction are sent in sync. For example, to capture a video, the actuator 30 and turntable 55 may be programmed to move with respect to each other.

For example, media capture instruction includes one or more of the following:
(a) lens settings; and
(b) timer settings for when the media capture device is to capture media.

For example, the media capturing device 40 is a Canon 1DX Mark II. In some embodiments, the media capturing device 40 has interchangeable lens and may be fitted with a suitable lens such as a 24 mm cine lens or a cine 35 mm lens.

In some embodiments, media capture instruction may be performed in sync with other instructions such as the lighting instruction to ensure the appropriate lighting on the product is cast when a photo or video is being captured. In other embodiments, when a video is captured by the media capturing device 40, the turntable 55 may be turning with respect to the media capturing device 40 at a particular angular velocity and from a certain origin point to a specified angular displacement of the turntable 55, for example, to ensure a full 360° video of the product is captured.

In some embodiments, a 360° video is captured by actuating the media capture device 40 to begin recording a video and the actuator 30 is stationary whilst the turntable 55 rotates at an angular velocity about an axis. In other embodiments, a 360° video is captured by actuating the media capture device 40 to begin recording a video and the turntable 55 is stationary whilst the media capture device 40 coupled to the actuator 30 moves around the product. In yet another embodiment, a 360° video is captured by actuating the media capture device 40 to begin recording a video and both the turntable 55 and the media capture device 40 coupled to the actuator 30 moves with respect to one another.

Figure 8:
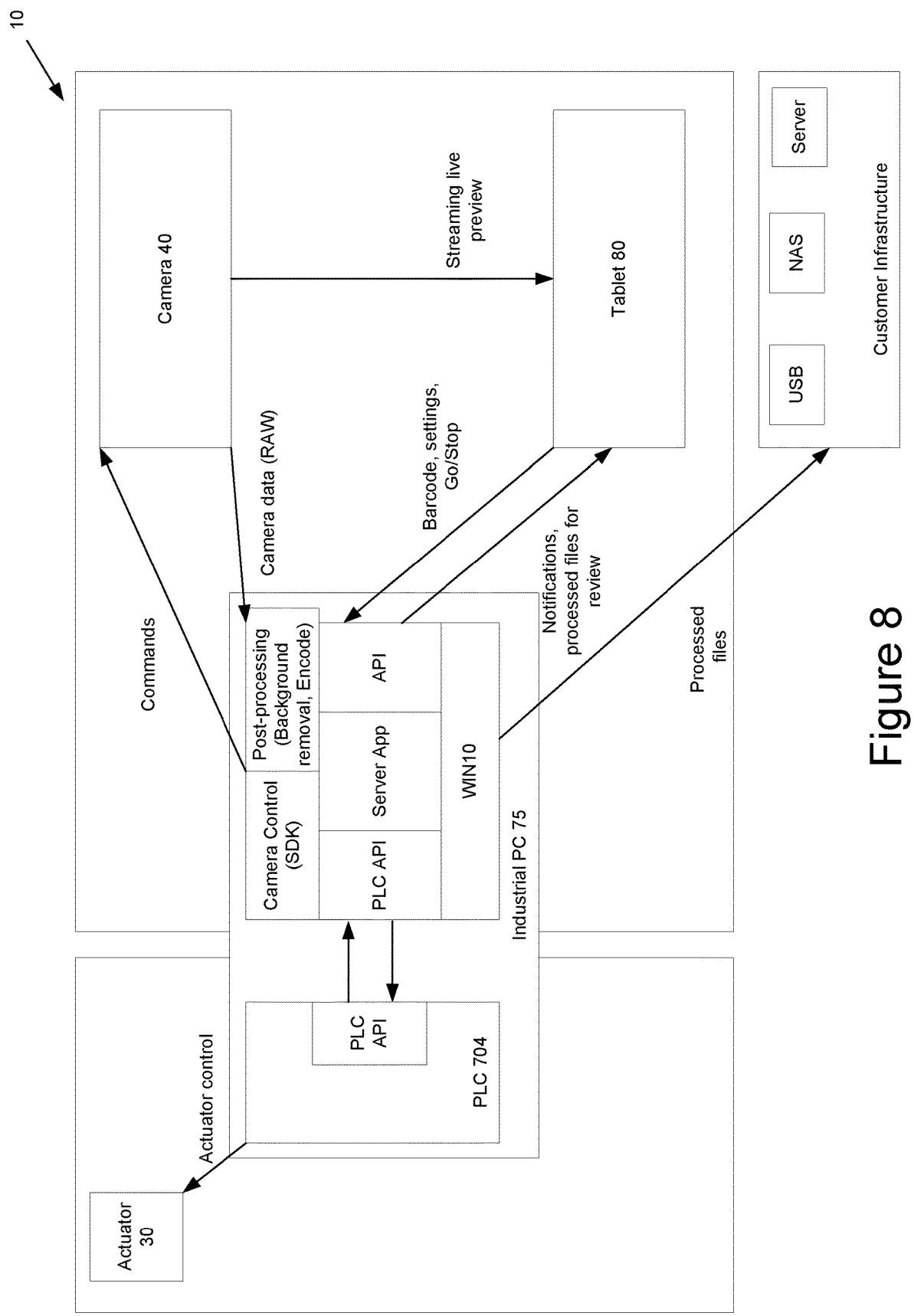
FIG. 8 is a schematic diagram of an embodiment of the system shown in FIG. 1.

In some embodiments, the server 75 communicates with the media capturing device 40 using a SDK from the camera manufacturer via connections such as Ethernet or USB or network 20. For example, the Server Application of Industrial PC 75 as particularly shown in FIG. 8 sets up the camera 40 into a known state, and sets settings such as Aperture, Zoom, ISO, Shutter Speed, Focus and triggers the shutter for each capture. In some embodiments, the industrial PC 75 is located in the mount 50 as particularly shown in FIG. 3c. An uninterruptible power supply (UPS) 706 is preferably provided to the system 10 as particularly shown in FIG. 3c.

Advantageously, after the step of actuating the media capturing device 40 to capture an image of the product, the media capturing device 40 sends data associated with the captured image for display to the user 90 to one or more of the following:
(a) a display monitor; and
(b) the mobile computing device 80.

In some embodiments, the media capture device 40 is a 3D scanner. In another embodiment, the 3D scanner 450 is used in conjunction with a camera. Advantageously, the 3D scanner 450 is coupled to a distal end of actuator 30. For example, the product placed on mount 50 is rotated about a central axis by means of the turntable 55 whilst the 3D scanner 450 captures scans of the product. Scans of the product may include data associated with the distance between the 3D scanner 450 and the product for reconstructing a 3D model of the product. Scans may also include one or more images of the product. Further, scans of the top and bottom of the product are captured may be captured, for example by actuating the actuator 30 so that a scan of the top and/or bottom of the product is captured. Advantageously, the 3D scanner 450 is configured to capture a plurality of scans of a product placed on mount 50 for creating a digital 3D model of the product.

Preferably, the control system 70 further includes a programmable logic controller 704 for causing the actuator 30 to move upon receipt of actuator instructions from the one or more processors 3028. The programmable logic controller 704 preferably further includes an application programming interface for communicating with the one or more processors 3028 of the control system 70.

In some embodiments, the media capturing device 40 is physically set up within a custom environment featuring cycloramas, and lighting which will provide optimal conditions for the background removal algorithms. In some embodiments, a calibration sequence is performed to optimize the settings for one or more devices. For example, depending on the natural light available in the space, lighting settings may differ from day to day. As such, a number of test images may be captured by the media capture device 40 with various sets of lighting instruction to the lighting system 60. In some embodiments, the images are displayed to the user 90, for example on the mobile computing device 80 or a display monitor, and the user 90 chooses one or more images. The lighting instruction for the one or more images chosen is then used for the succeeding media capture sequences. Similar calibration sequences could be performed for the other instructions such as media capturing instructions, actuator instructions or turntable instructions. Other calibrations sequences using automatic post-processing image programs may also be employed.

In some embodiments, when the control 70 is first set up for a user 90, the server 75 is set up with:
user accounts (e.g. names, passwords and optionally profile pictures);
file save location (e.g. UNC path);
file type (e.g. TIFF, JPG, PNG);
file size (e.g. W×H in pixels); and
file name template, for example determines how the file will be named, using pre-defined strings, any information from the product's metadata, and other relevant information (such as date/time).

In some embodiments, a user 90 picks up a mobile computing device 80 to perform shoots of one or more products. The user 90 logs in to the app 2018 running on mobile computing device 80 by selecting their user account and entering a password, for example. The app 2018 authenticates the user 90 by communicating with the server 75 to ensure that the user account and password entered matches an entry stored on data storage 3024. The app 2018 then generates for display 2002 a dashboard display showing one or more of the following:
an image of the last product photographed, so that it is easy for users to know what is next in the queue; and
statistics about number of photos taken.

The app 2018 then queries server 75 to retrieve list of available packages for user 90 and generates on display 2002 for user selection. In some embodiments, the mobile computing device 80 switches to camera mode to access the built-in camera for the user 90 to place a product barcode to be read by the camera. The product barcode auto-populates the barcode metadata field. User 90 may also enter text such as Brand, Product Name, Description, and other descriptions or classifications of the product to be captured.

Media Capturing Process 9000

Figure 7A:
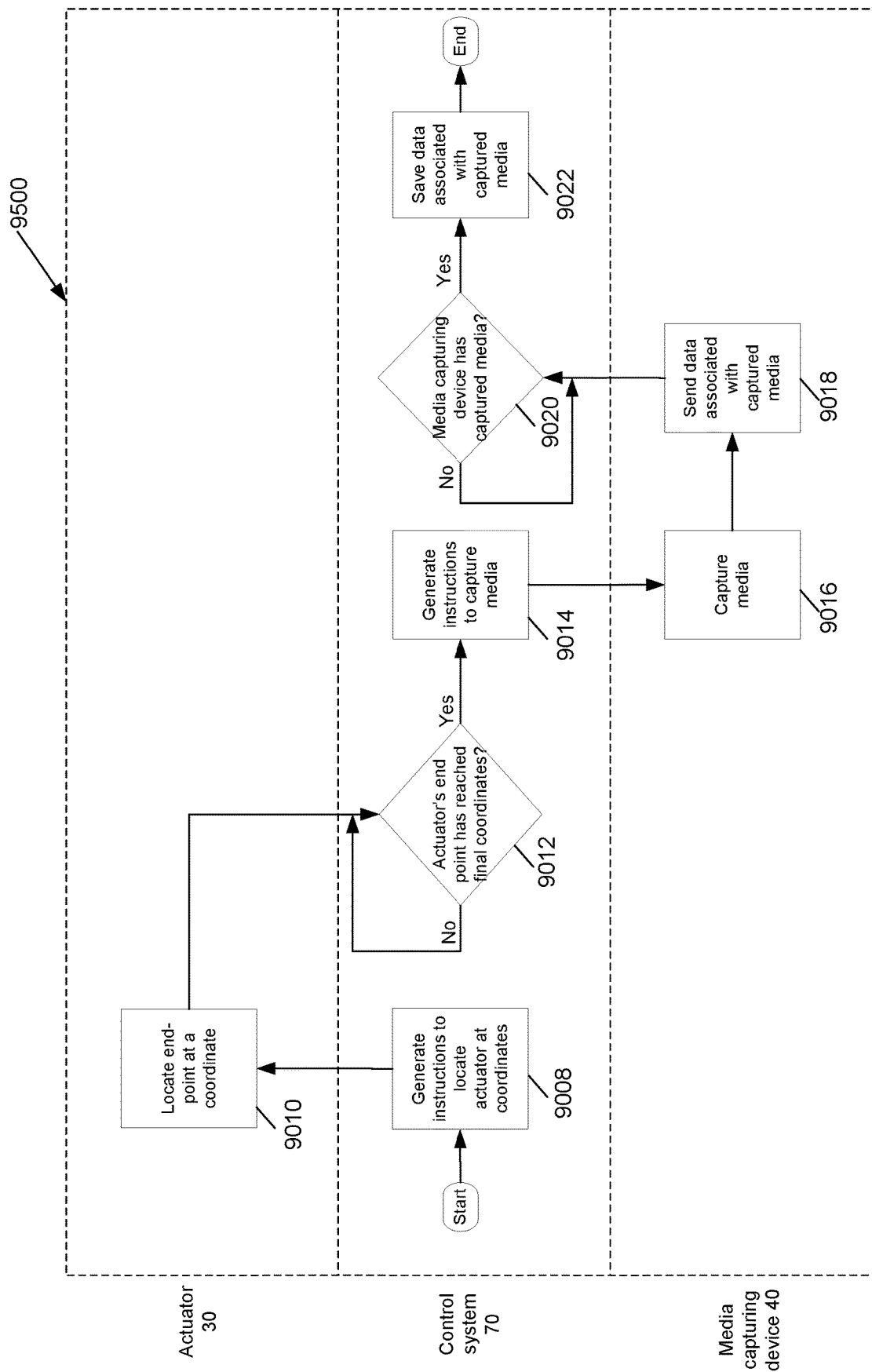
FIG. 7a is a flowchart diagram of a method for capturing a media of a product.
Figure 7B:
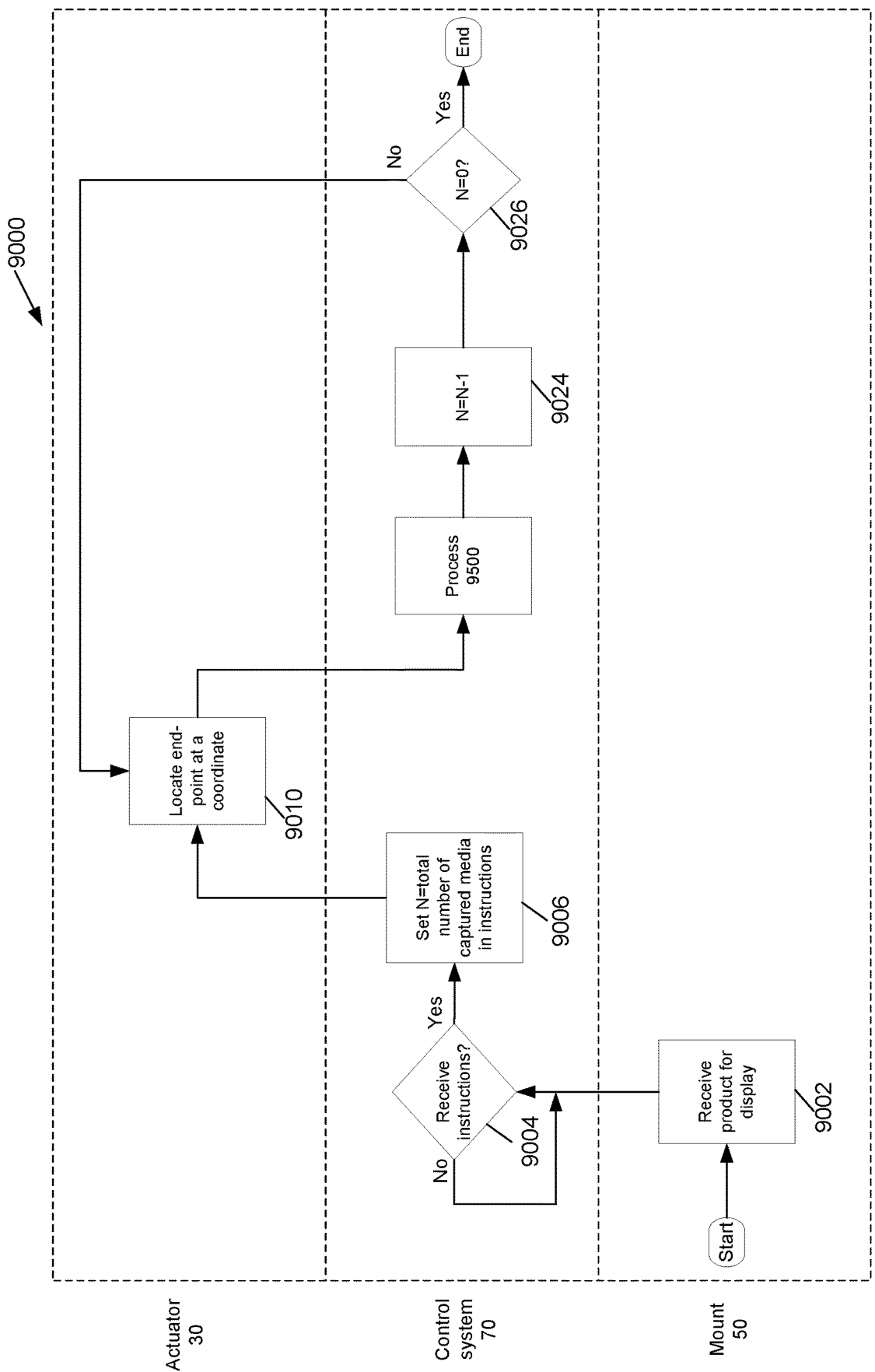
FIG. 7b is a flowchart diagram of a method for capturing more than one media of a product.

For example, media capturing process 9000, as particularly shown in FIG. 7b, includes process 9500 as particularly shown in FIG. 7a. At step 9002 of process 9000, the mount 50 receives product for display. For example, the user 90 may place a product on the surface of mount 50. In some embodiments, the system 10 includes a laser apparatus wherein, when executed, said plurality of instructions stored in data storage 3024 cause the control system 70 to perform the step of sending an activation signal to the laser apparatus so as to project one or more laser beams onto the mount 50 to allow a user 90 to display the product at a location on the mount 50. In some embodiments, the mount 50 includes an indicator, for example on the surface of mount 50, to indicate to the user 90 the direction that the product should be facing.

In some embodiments, a live preview is provided to the user 90, for example the mobile computing device 80 receives and displays an image of the product taken with the media capturing device 40. Implementation of live preview may be camera-specific. For example, for Canon cameras, a Live Preview stream is directly captured from the devices. For example, on RED cameras, the Live Preview is achieved by taking the monitor feed out of the camera, via a connection such as serial digital interface (SDI) for example, converting it to network device interface (NDI) and utilizing the NDI Connect Webserver to convert the NDI stream to JPEG frames, which are read via a WebSocket, for example.

At step 9004, the control system 70 waits until it receives begin instruction. Begin instruction may be received from the user 90 via mobile computing device 80, for example by means of a touch screen input via an app 2018. In other embodiments, one of the components of system 10, for example, the mount 50 or media capturing device 40 may detect that a product has been placed on the mount 50 and subsequently, sending begin instructions to the control system 70 to begin to capture media. For example, begin instructions may also include instructions to the weighing device 550 and/or scaling device 560 to begin weighing and/or scaling the product.

In some embodiments, a user 90 selects a package that they want to shoot and scans a product barcode using a barcode scanner, for example a camera on a mobile computing device 80, or enters metadata into a mobile computing device 80 as part of the begin instructions.

The control system 70 then checks begin instructions and determines if instructions are for capturing media is associated with capturing a single image or video or more than one images or videos. If instructions for capturing media associated with a single image or video, the control system 70 performs process 9500 as particularly shown in FIG. 7a. For example, a number of image capture and video capture programs can be combined and saved into a "Package" for user 90 selection. One or more "packages" may be offered to the user 90 as options depending on the type of product or online catalogue, for example.

For example, data storage 3024 includes a plurality of instructions stored thereon which, when executed by the one or more processors 3028, cause the system to perform the steps of:
  (a) at step 9008, moving the actuator 30 so as to locate the media capturing device 40 in a first one of said fixed positions with respect to the product displayed on the mount 50;
  (b) at step 9014, actuating the media capturing device 40 to capture a first image of the product;
  (c) at step 9022, saving said image of the product in said data storage 3024; and
  (d) repeating steps (a) to (c) for each successive fixed position in the series.

In some embodiments, the series of fixed positions is a single fixed position. In some embodiments, the step 9014 includes the processor sending media capture instruction to the media device 40. In other embodiments, step 9014 includes the processor sending 3D scanning instructions to 3D scanner 450, for example.

In some embodiments, step 9008 incudes the control system 70 generating instructions to locate the actuator 30 at coordinates and sending said instructions to the actuator 30. At step 9010, the actuator 30 receives instructions from the control system 70 and locates the end-point of the actuator, the end point coupled to the media capturing device 40, at the coordinates. Once the actuator 30 is located at the coordinates, at step 9012, the actuator 30 sends data to control system 70 indicating that the actuator's end point has reached the final coordinates. At step 9014, the control 70 generates instructions to capture media and sends it to media capturing device 40. At step 9016, the media capturing device 40 captures media. At step 9018, the media capturing device 50 sends data associated with the captured media to the control system 70. At step 9020, the control system 70 receives captured media from media capturing device 40 and at step 9022 saves the data associated with the captured media.

In some embodiments, instructions include capturing media associated with more than one image or video, system 10 performs the following before the step of moving the actuator 30:
  (a) at step 9006, the control system 70 sets a variable to be equal to the total number of media to be captured;
  (b) waiting until the captured media of the product is saved in data storage 3024 (step 9022);
  (c) at step 9024, decreasing the value associated with the variable by one;
  (d) at step 9026, if the new value associated with the variable is not equal to zero, performing the steps of:
    (i) moving the actuator 30 so as to locate the media capturing device 40 in a new position with respect to the product displayed on the mount 50;
    (ii) actuating the media capturing device 40 to capture media of the product;
    (iii) saving captured media of the product in said data storage 3024; and
    (iv) performing steps (c) to (d) again; and
  (e) if the new value associated with the variable is zero, end loop.

In some embodiments, the step of actuating the media capturing device 40 to capture an image of the product includes the steps of:
  (a) the processor 3028 sending media capture instruction to the media capturing device 40 including:
    (i) media capture settings; and
    (ii) timer settings for when the media capture device 40 is to capture the image; and
  (b) the media capturing device 40 applying the media capture setting; and
  (c) the media capturing device 40 capturing the image of the product.

In some embodiments, the captured media is one or more of the following:
  (a) an image for displaying the product at one angle with respect to the media capturing device 40;
  (b) a series of images for displaying the product at more than one angles with respect to the media capturing device 40; and (c) a video for displaying the product at more than one angles with respect to the media capturing device 40.

In some embodiments, the captured media of the product is transferred to server 75 or to the in-camera storage and then immediately transferred to the server 75. In other embodiments, data associated with the product such as weight, one or more dimensions and/or 3D scans are also transferred to server 75 or in-camera storage.

In some embodiments, step 3024 includes using parameters established in initial setup by the user 90 and files are processed to the correct size, names and then exported to the selected file type(s). In some embodiments, the files may also be uploaded to a website or to the cloud-based storage provider for later use. Users other than user 90 may be authorized to access the files thus allowing multiple parties to view and use the files associated with the captured media in a timely manner.

In some embodiments, after the step of saving captured media of the product in said data storage 3024, the one or more processors 3028 post-processes the captured media.

The post-processing process may be customised to each client's individual needs. It can, for example, include one or more of the following:
  (a) background removal via a variety of techniques, including one or more of the following:
    (i) difference matte by taking two photographs and generating a non-destructive mask, based on the difference between them;
    (ii) chromakey by utilising a chromakey library, tuned to a specific lighting setup. This library will remove a background colour, and any instances where that colour has spilled onto the foreground product; and
    (iii) strip white whereby if the exposure of the photo is set so the background is pure white, e.g. rgb(255, 255,255), those pixels can be removed by colour range deletion;
  (b) subject identification and selection by utilising software to create a non-destructive mask based on it's detection of the edges of the product;
  (c) background replacement which may be performed after background removal, which substitutes an image into the background and composites the foreground object over the top; and
  (d) export image set whereby one or more sets may be specified. Each set may specify one or more of following:
    (i) image resize by changing the pixel dimensions of the image to a specified size;
    (ii) image format export by changing the file format of the image to an specified format such as psd, tiff, png or jpeg; and
    (iii) file renaming by using a naming template to rename the file.

In other embodiments, post-processing may include constructing a 3D model of the product based on 3D scans captured by the 3D scanner 450. In other embodiments, post-processing includes calculating one or more dimensions based on data from the scaling device 560.

In some embodiments, images saved as TIFF or PSD, will retain an editable version of the mask. In other embodiments, PNG files will retain any transparency from the background removal.

In some embodiments, post-processing steps of video files include one or more of the following:
  (a) trimming to a specified length;
  (b) converting to a specified file format e.g. mp4, mov, .h264;
  (c) resizing the video to a specified resolution;
  (d) altering the frame rate of the video; and
  (e) chromakey-based background removal.

After post-processing, the server 75 sends to the mobile computing device 80 data associated with the post-processed image for the user 90 to view. In some embodiments, the user 90 confirms that the media has been captured correctly. A user may opt to reposition the product and rerun a package to re-capture media.

Mobile Computer Device 80

Figure 9:
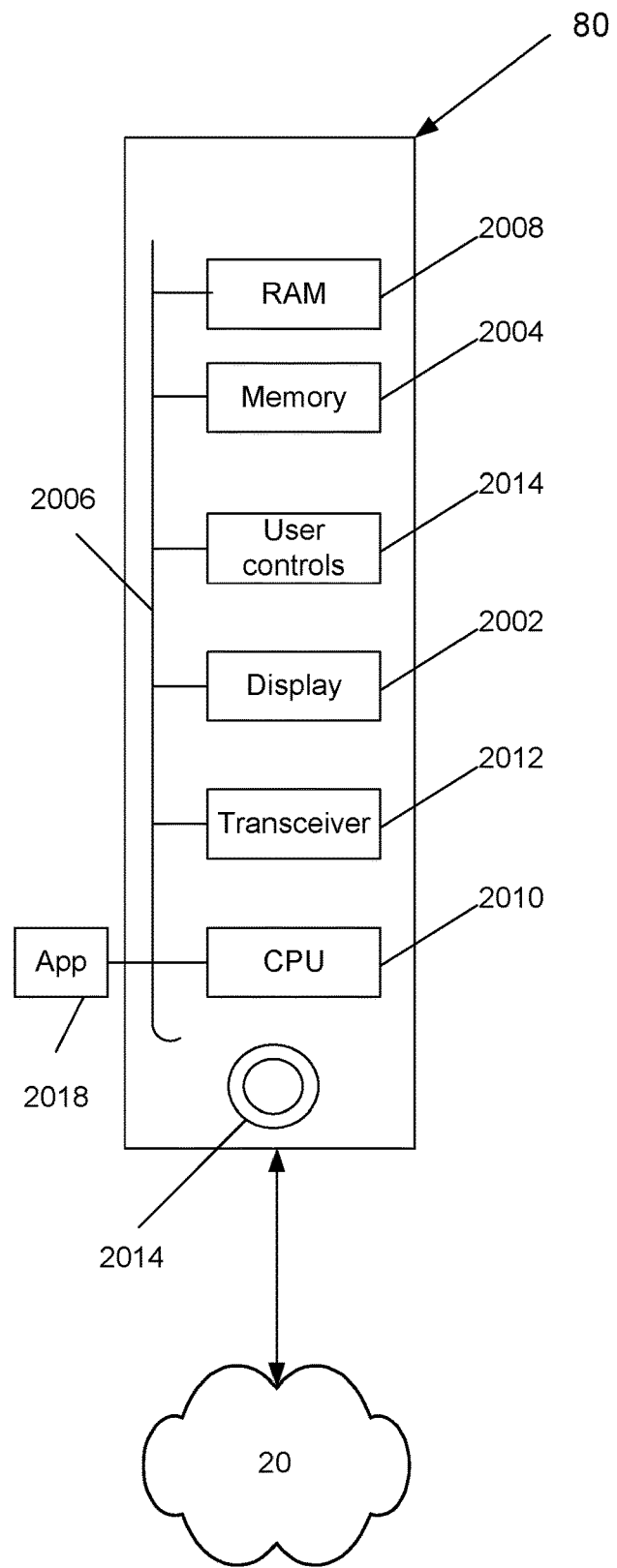
FIG. 9 is a schematic diagram showing components of an exemplary mobile computing device.

FIG. 9 is a block diagram showing an exemplary mobile computing device 80 in which embodiments of the invention may be practiced. The mobile computing device 80 may be a mobile computer device such as a tablet. For ease of description, the mobile computing device 80 is described below, by way of non-limiting example, with reference to a mobile device in the form of a tablet such as a Surface Pro with Windows®, or similar devices such as a device manufactured by Apple™, Inc., or one manufactured by LG™, HTC™ and Samsung™, for example. The mobile computing device 80 may also be a smart phone or an interactive kiosk.

As shown, the mobile computing device 80 includes the following components in electronic communication via a bus 2006:
  (a) a display 2002;
  (b) non-volatile (non-transitory) memory 2004;
  (c) random access memory ("RAM") 2008;
  (d) N processing components 2010;
  (e) a transceiver component 2012 that includes N transceivers; and
  (f) user controls 2014.

Although the components depicted in FIG. 9 represent physical components, FIG. 9 is not intended to be a hardware diagram. Thus, many of the components depicted in FIG. 9 may be realized by common constructs or distributed among additional physical components. Moreover, it is certainly contemplated that other existing and yet-to-be developed physical components and architectures may be utilized to implement the functional components described with reference to FIG. 9.

The display 2002 generally operates to provide a presentation of content to a user, and may be realized by any of a variety of displays (e.g., CRT, LCD, HDMI, micro-projector and OLED displays).

In general, the non-volatile data storage 2004 (also referred to as non-volatile memory) functions to store (e.g., persistently store) data and executable code.

In some embodiments for example, the non-volatile memory 2004 includes bootloader code, modem software, operating system code, file system code, and code to facilitate the implementation components, well known to those of ordinary skill in the art, which are not depicted nor described for simplicity.

In many implementations, the non-volatile memory 2004 is realized by flash memory (e.g., NAND or ONENAND memory), but it is certainly contemplated that other memory types may be utilized as well. Although it may be possible to execute the code from the non-volatile memory 2004, the executable code in the non-volatile memory 2004 is typically loaded into RAM 2008 and executed by one or more of the N processing components 210.

The N processing components 2010 in connection with RAM 2008 generally operate to execute the instructions stored in non-volatile memory 2004. As one of ordinarily skill in the art will appreciate, the N processing components 2010 may include a video processor, modem processor, DSP, graphics processing unit (GPU), and other processing components.

The transceiver component 2012 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

It should be recognized that FIG. 9 is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium 2004.

Non-transitory computer-readable medium 2004 includes both computer storage medium and communication medium including any medium that facilitates transfer of a computer program from one place to another. A storage medium may be any available medium that can be accessed by a computer.

System 75

Figure 10:
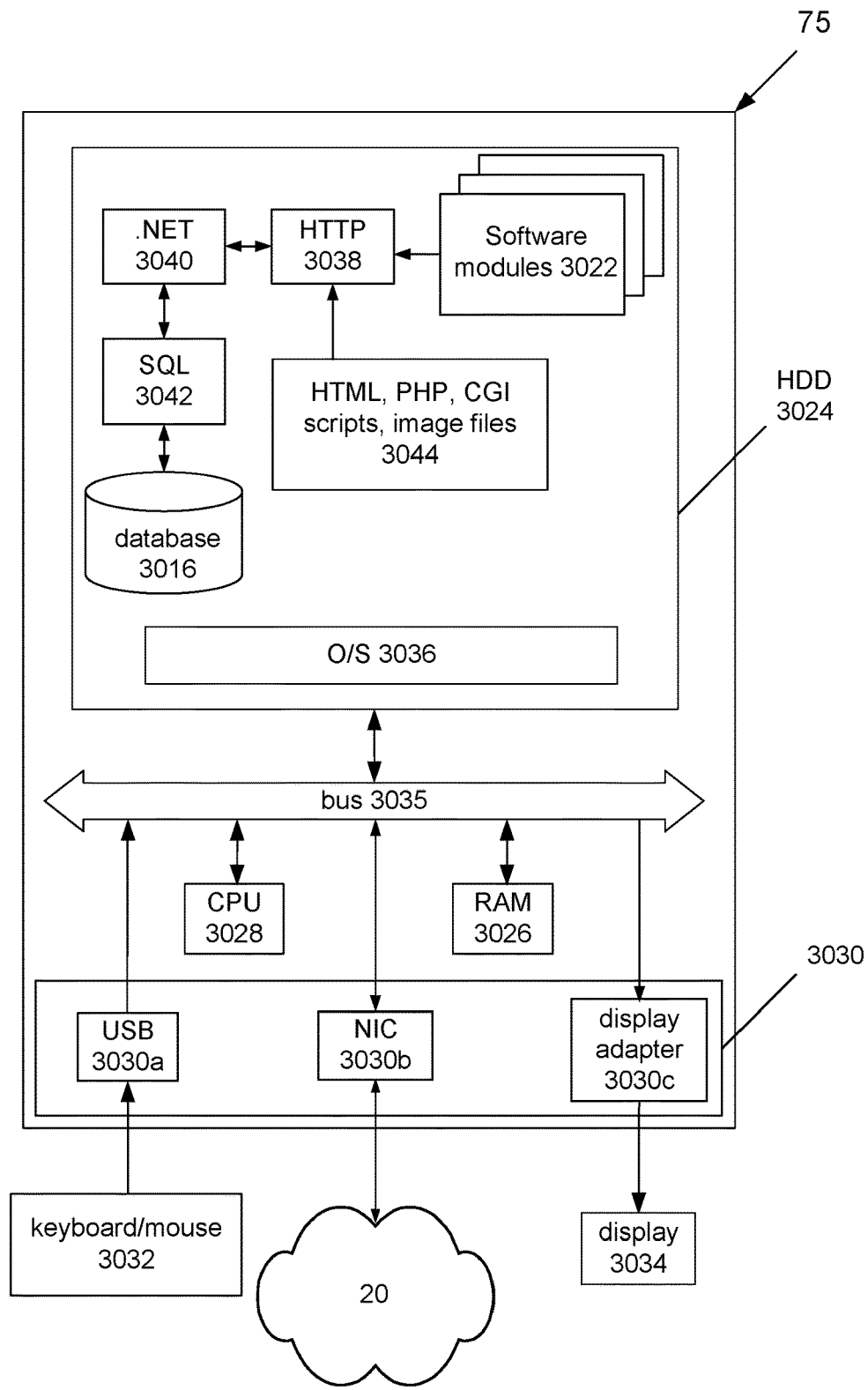
FIG. 10 is a schematic diagram showing components of an exemplary computing device.

Server 75 may be embodied by a system as particularly shown in FIG. 10. In some embodiments, the server may comprise multiple servers in communication with each other, for example over a local area network or a wide-area network such as the Internet. As described in the preceding section, the server 75 is able to communicate with other components of the system 10 over the network 20 using standard communication protocols.

In some embodiments, the server computer is an Industrial PC that contains a standard Windows PC and a Programmable Logic Controller (PLC). The PLC controls the actuator 30 and media capturing device 40 movements, as well as the turntable 55 and lighting system 60 (such as LED colour and brightness).

The components of the server 75 can be configured in a variety of ways. The components can be implemented entirely by software to be executed on standard computer server hardware, which may comprise one hardware unit or different computer hardware units distributed over various locations, some of which may require the communications network 20 for communication. A number of the components or parts thereof may also be implemented by application specific integrated circuits (ASICs) or field programmable gate arrays.

In the example shown in FIG. 10, the server 75 is a commercially available server computer system based on a 32 bit or a 64 bit Intel architecture, and the processes and/or methods executed or performed by the server 75 are implemented in the form of programming instructions of one or more software components or modules 3022 stored on non-volatile (e.g., hard disk) computer-readable storage 3024 associated with the server 75. At least parts of the software modules 3022 could alternatively be implemented as one or more dedicated hardware components, such as application-specific integrated circuits (ASICs) and/or field programmable gate arrays (FPGAs).

The server 75 includes at least one or more of the following standard, commercially available, computer components, all interconnected by a bus 3035:

(a) random access memory (RAM) 3026;
(b) at least one computer processor 3028, and
(c) external computer interfaces 3030:
  (i) universal serial bus (USB) interfaces 3030a (at least one of which is connected to one or more user-interface devices, such as a keyboard, a pointing device (e.g., a mouse 3032 or touchpad),
  (ii) a network interface connector (NIC) 3030b which connects the server 75 to a data communications network, such as the wireless communications network 20; and
  (iii) a display adapter 3030c, which is connected to a display device 3034 such as a liquid-crystal display (LCD) panel device.

The server 75 includes a plurality of standard software modules, including:

(a) an operating system (OS) 3036 (e.g., Microsoft Windows 10);
(b) web server software 3038 (e.g., Microsoft Internet Information Server);
(c) scripting language modules 3040 (e.g., .NET, or Microsoft ASP); and
(d) structured query language (SQL) modules 3042 (e.g., MongoDB), which allow data to be stored in and retrieved/accessed from an SQL database 3016.

Advantageously, the database 3016 forms part of the computer readable data storage 3024. Alternatively, the database 3016 is located remote from the server 75 shown in FIG. 10.

Together, the web server 3038, scripting language 3040, and SQL modules 3042 provide the server 75 with the general ability to allow the other components of the system 10 to communicate with the server 75 and in particular to provide data to and receive data from the database 3016. It will be understood by those skilled in the art that the specific functionality provided by the server 75 to such users is provided by scripts accessible by the web server 3038, including the one or more software modules 3022 implementing the processes performed by the server 75, and also any other scripts and supporting data 3044, including markup language (e.g., HTML, XML) scripts, PHP (or ASP), and/or CGI scripts, image files, style sheets, and the like.

The boundaries between the modules and components in the software modules 3022 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the server 75 may be executed by a module (of software modules 3022) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The server 75 normally processes information according to a program (a list of internally stored instructions such as a particular application program and/or an operating system) and produces resultant output information via input/output (I/O) devices 3030. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge.

The invention claimed is:

1. A portable system for capturing images of a product from a series of fixed positions around the product, including:
   (a) a control system including one or more processors in communication with data storage;
   (b) an actuator;
   (c) a media capturing device coupled to the actuator; and
   (d) a mount coupled to the actuator, the mount including an upper surface for displaying the product thereon;
   wherein said data storage includes a plurality of instructions stored thereon which, when executed by the one or more processors, cause the system to perform the steps of:
   (a) moving the actuator so as to locate the media capturing device in a first one of said fixed positions with respect to the product displayed on the mount;
   (b) actuating the media capturing device to capture a first image of the product;
   (c) saving said image of the product in said data storage; and
   (d) repeating steps (a) to (c) for each successive fixed position in the series; and
   wherein the step of actuating the media capturing device to capture an image of the product includes the steps of:
   (a) the processor sending media capture instruction to the media capturing device including:
     (i) media capture settings; and
     (ii) timer settings for when the media capture device is to capture the image;
   (b) the media capturing device applying the media capture setting; and
   (c) the media capturing device capturing the image of the product;
   wherein the actuator is a robotic aim having at least 5 degrees of freedom for locating the media capturing device in one or more fixed position(s) around the product displayed on the mount;
   wherein the media capturing device is coupled to a distal end of the robotic arm so that the step of moving the actuator so as to locate the media capturing device in a fixed position includes moving the distal end of the robotic arm to the fixed position;
   wherein the mount further includes a lighting system for illuminating the displayed product;
   wherein, upon receipt of lighting instructions from the control system, the lighting system illuminates the displayed product while the media capturing device is capturing one or more images of the product; and
   wherein the mount includes a turntable, and wherein on receipt of a position instruction from the control system, the turntable rotates about an axis for rotating the displayed product from a fixed position to another fixed position to capture an image of the product from the another fixed position.

2. The system of claim 1, wherein the series of fixed positions is a single fixed position.

3. The system of claim 1, wherein on receipt of a velocity instruction from the control system, the turntable rotates about an axis to rotate the product at a fixed velocity to allow, the media capturing device to capture one or more images of the product from one or more fixed positions as it rotates.

4. The system of claim 1, wherein before the step of moving the actuator, the control system performs motion planning for setting a path for the actuator to move from a first position to a second position.

5. The system of claim 1, wherein after the step of actuating the media capturing device to capture the image of the product, the media capturing device sends data associated with the captured image for display to the user to one or more of the following:
   (a) a display monitor; and
   (b) a mobile computing device.

6. The system of claim 1, wherein the control system further includes a programmable logic controller for causing the actuator to move upon receipt of actuator instructions from the one or more processors.

7. The system of claim 6, wherein the programmable logic controller further includes an application programming interface for communicating with the one or more processors of the control system.

8. The system of claim 1, wherein the control system further includes a mobile computing device for receiving user instruction and communicating the user instruction to the one or more processors of the control system.

9. The system of claim 8, wherein the data associated with the user instruction is used as an input to one or more of the following:
   (a) actuator instruction;
   (b) lighting instruction;
   (c) media capture instruction; and
   (d) turntable instruction.

10. The system of claim 1, further including a laser apparatus, wherein, when executed, said plurality of instructions stored in data storage cause the system to perform the step of sending an activation signal to the laser apparatus so as to project one or more laser beams onto the mount to allow a user to display the product at a location on the mount.

11. The system of claim 1, wherein after the step of saving captured image of the product in said data storage, the one or more processors post-processes the one or more captured images.

* * * * *